March 17, 1931.    E. W. SCHELLENTRAGER    1,796,480
AUTOMATIC BIN GATE ACTUATING MEANS
Filed May 31, 1927
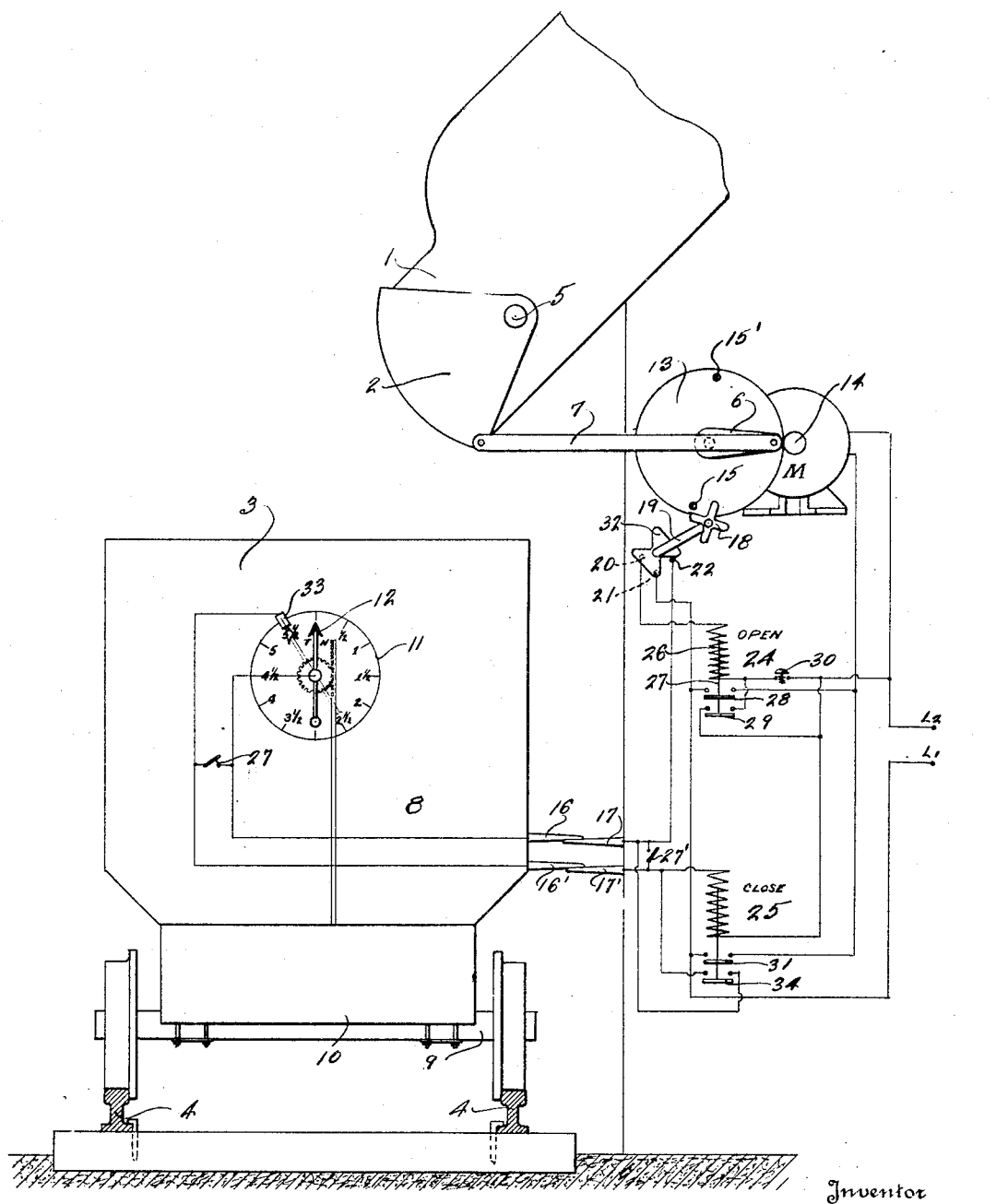
Inventor
Eugene W. Schellentrager
By Brockett & Hyde
Attorneys Patented Mar. 17, 1931

1,796,480

UNITED STATES PATENT OFFICE

EUGENE W. SCHELLENTRAGER, OF SHAKER HEIGHTS, OHIO, ASSIGNOR TO THE ATLAS BOLT & SCREW COMPANY, OF CLEVELAND, OHIO, A CORPORATION OF OHIO

AUTOMATIC BIN-GATE-ACTUATING MEANS

Application filed May 31, 1927. Serial No. 195,556.

This invention relates to operating means for bin gates and has particular reference to operating means for the gate of a bin arranged to load a dump car of the weighing and indicating type movable as on tracks between dumping positions and a position beneath the bin gate.

A dump car of the type to which reference has been made may be of any well-known construction provided with weighing mechanism intermediately positioned between the load carrying portion of the car and the wheeled truck supporting the same, and with a calibrated scale over which an indicator in connection with the carrying car portion moves to indicate at all times the weight of the car contents.

Such a car is found in many industrial applications, where the speed and accuracy of loading are equally highly important.

It is further common practice in the art to arrange the gate of a bin in connection with which the car is used, with electrical actuating mechanism, ordinarily controlled by hand from a position in which the car scale is visible.

It is the object of the present invention to provide a means whereby the gate operating mechanism is actuated automatically to close the gate subject to accumulation in the car of a load of predetermined weight.

The exact nature and further objects and advantages of my invention will be apparent from the following description taken in connection with the accompanying drawing, which more or less diagrammatically discloses the bin mouth 1 controlled by a gate 2, which when opened allows a dump car 3, movable upon the tracks 4 to a position beneath the mouth 1, to receive a load from the bin. The gate is pivotally mounted at 5 and in connection with a crank 6 through a connecting rod 7 the crank being movable with the gear wheel 13 in operative connection with a pinion 14 on motor M arranged for uni-directional actuation in a counter clockwise direction, the gate operating mechanism thus being of the well known "run around" type, wherein continued rotation of the motor M would result in oscillating movement of the gate 2 with corresponding alternate opening and closing of the bin mouth. The hopper 8 of the dump car is supported on the axles 9 through a scale mechanism within the box 10 the details of which, forming no part of this invention, are not specifically set forth herein.

Upon the car is fixed a calibrated scale 11 over which moves an indicator 12 in connection, as through the rack and pinion shown in broken lines, with the mechanism within the box 10 whereby the net weights of the contents of the car hopper are indicated at all times.

Upon the car scale 11 I provide a contactor 33 adapted to be secured with the scale peripherally at a position opposite the graduations indicating the weight to which it is desired the car be loaded. The indicator 12 is diagrammatically shown as wired and arranged to complete a connection with the contactor 33 when the car has been thus loaded.

Upon the car are a pair of collector fingers 16, 16' adapted to make respective connection with a pair of collectors 17, 17' in fixed relation with respect to the bin, whereby connection will be made between the collectors as shown in the drawing only when the car is positioned to receive the discharge through the bin mouth. Switches 27 and 27' are arranged to establish a parallel connection for a purpose to be described.

Carried by the gear 13 are a pair of substantially diametrically arranged pins 15, 15'. A member 18 provided with the radial arms indicated, in the plane of the pins 15 and 15' for successive engagement thereby upon rotation of the gear 13 to effect a 90° rotation of the member. The member 18 is in connection as by axial member 19 with a commutator member 32 having the diametrically opposed commutating segments indicated, each of somewhat more than 180°. Arranged for wiping with these commutator segments are the switch points 20, 21 and 22. The relative arrangement of the switch points, commutator and member 18 is such that movement of the member 18 by either of the pins will leave one segment of the commutator 32 bridging a cross either the switch points 20, 21 or 21 and 22.

For the purpose of primary control of the motor to open the gate 2, I provide a relay switch generally designated by the numeral 24, and for closing the gate a generally similar relay 25. The relay 24 comprises a coil 26, an armature 27 movable thereby and carrying a pair of contactors 28 and 29 adapted upon energization of the coil 26 to establish contacts as indicated, all as will be well understood by any one familiar with the art.

A push button 30 is provided as indicated for a purpose to be described. The relay 25 is similar to the relay 24 having contactor 31 and 34.

Operation of my invention will be as follows: Assuming the parts in the position illustrated, the bin gate closed, the car in a position thereunder and empty. To open the gate the operator who may be on the car or adjacent the gate, depresses the push button 30 which is located for easy reach from either position of the operator. Depression of the push button establishes a circuit for the coil 26 of the relay 24, circuit being from L1 through switch points 21, 20, coil 26, push button 30 to L2. Energization of the coil 26 raises the armature contactors 28 and 29 to close across their respective switch points. The action of the contactor 28 completing a motor circuit from L1 through contactors 28, through the motor to L2. Starting the motor to rotate the gear 13 in a counter clockwise direction to open the bin gate, contactor 29 completing a circuit by passing the push button 30, and thus maintaining the coil 26 energized.

The motor operation continues until the pin 15′ engages the member 18 to rotate the same in a counter clockwise direction, moving the commutator 32 to open the circuit between switch points 20 and 21 and bridging across switch points 21, 22. Immediately the commutator passes off the point 20 the coil 26 of the relay 24 is de-energized allowing the armature 27 to drop and open the motor circuit. The pin 15′ is secured upon the gear in such position that the motor will be thus stopped at full gate opening. The contactor 33 having been adjusted upon the dial 11 to the desired load indication on the scale, the contents of the bin are discharged through its mouth to the car hopper, the scale indicator 12 moving from zero position on the dial in a clockwise direction until contact is effected at 33, such contact establishes a circuit to energize the coil of the relay 25, this being as follows: from L1 through switch points 21 and 22, collectors 17, 16, through the indicator 12, contactor 33, collectors 16′ and 17′ and through the coil of the relay back to L2. Energization of the relay coil effects contacting movement of the member 31 completing a motor circuit for actuation of the motor to close the bin gate. This circuit is from L1, through contactor 31 and through the motor back to L2. Contact is established by the member 34 simultaneously with that by contactor 31 to establish a maintaining circuit for the coil of the relay 25 by-passing the scale indicator, this circuit being as follows: from L1 through switch points 21, 22 through the contactor 34, through the coil of the relay and to L2.

The motor continues in operation closing the bin gate until as the gate arrives at closed position the pin 15 engages the member 18 to rotate the commutator 32 to break connection against the points 21 and 22 and reestablishes connection between the points 20 and 21. Breaking of contact across 21, 22 opens the circuit of the coil of the relay 25 and thus the motor circuit. The car having thus been accurately and automatically loaded to the desired amount, may then be moved away from the bin.

The switches 27, 27′ are provided for the purpose of hand initiation of closing movement of the gate as will be evident.

What I claim is:

1. In combination with a bin, a gate controlling the discharge therefrom, and a weighing dump car movable to a position to receive said discharge and provided with relatively movable means for indicating the weight of the contents of said car, power means associated with said gate for opening and closing the same, means associated with said indicating means for controlling said power means dependent upon pre-selected weight indication, and means for establishing connection between said associated means in said car position, whereby closing of said gate is effected automatically upon loading of said car to a preselected weight.

2. In combination with a bin, a gate controlling the discharge therefrom, and a weighing dump car movable to a position to receive said discharge and provided with relatively movable means for indicating the weight of the contents of said car, power means associated with said gate for opening and closing the same, means associated with said indicating means for energizing said power means to close said gate dependent upon preselected weight indication, and means for establishing connection between said associated means in said car position, whereby closing of said gate is effected automatically upon loading of said car to a preselected weight.

3. In combination with a bin, a motor operated gate controlling the discharge therefrom, and a weighing dump car movable to a position to receive said discharge and provided with relatively movable means for indicating the weight of the contents of said car, means associated with said indicating means for energizing said gate motor to close said gate, means for adjusting said associated means to automatically effect said energization upon loading of said car to a preselected weight, and means for establishing operative connection between said motor and said associated means in said position of said car, for the purpose described.

4. In combination with a bin, a motor-operated gate controlling the discharge therefrom, and a weighing dump car movable to a position to receive said discharge and provided with a pointer movable over a scale to indicate the weight of contents of said car, a contactor adjustable on said scale and adapted for engagement by said pointer upon loading of said car to the weight indicated by said contactor, collectors on said car and associated with said motor respectively and adapted for interengagement in said position of said car, and a circuit including said elements whereby said motor is energized to close said gate upon movement of said pointer to engage said adjustable contactor.

5. In combination with a bin, a motor-operated gate controlling the discharge therefrom, and a weighing dump car movable to a position to receive said discharge and provided with a pointer movable over a scale to indicate the weight of contents of said car, a contactor adjustable on said scale and adapted for engagement by said pointer upon loading of said car to the weight indicated by said contactor, contactors on said car and associated with said motor respectively and adapted for interengagement in said position of said car, relays adapted for primary control of said motor, and circuits including said elements whereby said motor is energized to close said gate upon movement of said pointer to engage said adjustable contactor.

6. The combination with a bin having a discharge mouth, of a dumping container adapted to travel adjacent the bin in position to receive a load from the mouth thereof, actuating means for regulating discharge of material from the bin mouth, a movable member traveling with said container and adapted to assume various positions in accordance with the weight of the load deposited therein, and means governed thereby for controlling said actuating means.

7. A combination of the character described in claim 6, in which said last named means controls the actuating means in a manner to stop discharge of material.

8. A combination of the character described in claim 6, in which said last named means is adjustable to cause operation of said actuating means to stop the discharge of material when any pre-selected weight of material has been deposited in the container.

9. Material handling apparatus, comprising a bin, means for controlling the discharge of material therefrom, power operating means therefor, a weighing dumping container adapted to receive the material discharged, means movable to various positions in accordance with variations in the weight of material in said container, and means establishing associated relation between said movable means and said power means for controlling the latter according to pre-selected weight of material, whereby said discharge controlling means is actuated automatically upon loading of the container to a pre-selected weight.

In testimony whereof I hereby affix my signature.

EUGENE W. SCHELLENTRAGER.